United States Patent [19]

Stevens Jr.

[11] Patent Number: 4,828,077
[45] Date of Patent: * May 9, 1989

[54] SOLENOID AND SPRING OPERATED BRAKE

[75] Inventor: Howard C. Stevens Jr., Muskegon, Mich.

[73] Assignee: Lift-Tech International, Inc., Muskegon, Mich.

[ * ] Notice: The portion of the term of this patent subsequent to Jun. 7, 2005 has been disclaimed.

[21] Appl. No.: 158,409

[22] Filed: Feb. 22, 1988

Related U.S. Application Data

[63] Continuation of Ser. No. 927,588, Nov. 6, 1986, Pat. No. 4,749,067.

[51] Int. Cl.$^4$ .................. B60T 11/04; F16D 55/08
[52] U.S. Cl. ............................ 188/171; 188/72.9; 188/163
[58] Field of Search ............ 188/71.3, 72.1, 72.9, 188/161, 163, 171

[56] References Cited

U.S. PATENT DOCUMENTS

| | | | |
|---|---|---|---|
| 2,939,551 | 7/1960 | Hansen | 188/72.9 X |
| 3,171,514 | 3/1965 | Strain | 188/171 |
| 3,171,515 | 3/1965 | Wolfe | 188/171 |
| 3,202,244 | 8/1965 | Vogelsong et al. | 188/171 |
| 3,221,845 | 12/1965 | Hansen | 188/171 |
| 3,288,255 | 11/1966 | Palme | 188/171 |
| 3,500,971 | 3/1970 | McCarthy | 188/171 |
| 3,525,424 | 8/1970 | McCarthy | 188/171 |
| 3,556,266 | 1/1971 | McCarthy | 188/171 |
| 3,830,344 | 8/1974 | Cervenec et al. | 188/171 |
| 3,858,700 | 1/1975 | Kirshling . | |
| 3,878,922 | 4/1975 | McCarthy | 188/163 |
| 4,022,301 | 5/1977 | Hansen | 188/72.1 |
| 4,042,077 | 8/1977 | McCarthy | 188/171 |
| 4,181,201 | 1/1980 | McCarthy . | |
| 4,583,609 | 4/1986 | Anderson et al. | 180/65.5 |
| 4,749,067 | 6/1988 | Stevens Jr. | 188/171 |

OTHER PUBLICATIONS

Stearns Series 48000 Brake.
Stearns Series 55,500 Brake.
Dings 'Unipac' Brake.
Reliance Electric, Type F-Size 50 Brake.
Reliland Electric, 'Magnastop' Brake.
Reliland Electric Heavy Duty Brake.
Dresser Series '800' Hoist Motor Brake.

*Primary Examiner*—Andres Kashnikow
*Assistant Examiner*—Richard Potosnak
*Attorney, Agent, or Firm*—Basile and Hanlon

[57] ABSTRACT

An inner pressure pad is positioned on support members adjacent to the disk and generally parallel to the disk. An outer pressure pad is positioned on the support members with the disk interposed in between the inner pressure pad and the outer pressure pad, and the outer pressure pad is generally parallel to the disk. Springs are inserted on the support members and interposed in between the inner pressure pad and the outer pressure pad to urge the outer pressure pad away from the disk. A lever is pivotally mounted on the support members at a distance away from the outer pressure pad, and normally extends generally parallel to the outer pressure pad. Adjusting means are secured to the lever with one end extending to normally contact the outer pressure pad. A frame member is secured to the support members to partially enclose the lever and the disk. The frame member has a fulcrum formed thereon protruding from the frame member to contact the lever on the side opposite from the disk. A solenoid is supported by the frame member, and has an armature pivotally attached directly to the lever at a distance Y from the fulcrum. A second spring is connected to the frame member at one end and at another end to the lever, at a distance Z from the fulcrum which is at least equal to the distance Y.

14 Claims, 3 Drawing Sheets

SOLENOID AND SPRING OPERATED BRAKE

This application is a continuation of application Ser. No. 927,588, filed Nov. 6, 1986 now U.S. Pat. No. 4,749,067.

BACKGROUND OF THE INVENTION

I. Field of the Invention

The present invention relates to brakes for motors and, more particularly, to the mechanisms for applying and releasing brakes.

II. Description of the Prior Art

Spring applied, magnetically released brakes are broadly known in the art. For example, U.S. Pat. No. 4,181,201 shows a spring applied, electromagnetically released brake mechanism in which a compression spring is attached to one end of an elongated brake lever opposite from the hinge point of the brake lever. The brake lever, adjacent to the hinge point of the brake, operates a brake shoe which engages a rotatable brake disk and brings the disk into and out of engagement with a fixed brake plate mounted within the housing. A solenoid is mounted between the hinge point of the brake lever and the compression spring. The solenoid is connected via a cam linkage to cause pivotal movement of the brake lever.

U.S. Pat. No. 4,042,077 shows a spring applied, electromagnetically operated hydraulic released brake. U.S. Pat. No. 4,022,301 shows a spring applied, electromagnetically released brake which includes a cam and cam followers to move a brake lever about one end coaxial with the spring. The spring and the brake lever cooperate to apply force on the floating jaw which drives the floating jaw and the intermediate brake pad into engagement with a fixed jaw, thereby preventing the brake disk from rotation. A solenoid which operates the cam is located outside of the spring and the fulcrum point of the brake lever. U.S. Pat. No. 3,556,266 shows a spring applied, electromagnetically released brake, wherein the entire brake plate is moved in and out of engagement with the brake disk.

U.S. Pat. No. 3,525,424 shows a spring applied, electromagnetically released brake where a solenoid acts on the brake lever at its free end opposite from the hinged end. The spring is positioned closer to the hinged end than the solenoid. U.S. Pat. No. 3,500,971 shows a spring applied, electromagnetically released brake where a solenoid acts through a series of links, camming rollers and brake lever. The brake lever is pivoted about a hinged connection. U.S. Pat. No. 3,221,845 shows a spring applied, electromagnetically released brake where a solenoid acts through a rocker arm which is connected to a cam shaft interacting with a yoke lever. The yoke lever pivots about two conventional ball bearings disposed between the yoke lever and the mounting plate. U.S. Pat. No. 3,171,515 shows a spring applied, electromagnetically released brake where the solenoid is mounted outboard of the spring which is centrally aligned on a common axis with the motor shaft. A pair of mating disks and rings are brought into and out of engagement by movement of an armature to energize or deenergize the motor.

Electromagnetically applied, spring released brakes are also broadly known in the art. For example, U.S. Pat. No. 3,878,922 shows an electromagnetically applied, spring released brake where a solenoid acts through a linkage assembly to apply the brake lever arm. The springs release the brake when the solenoid is deenergized by returning the linkage assembly to a rest position. U.S. Pat. No. 3,858,700 also shows an electromagnetically applied, spring released brake where the brake disk is an armature which is drawn toward a magnetic winding when energized, causing frictional forces to occur between the face of the armature and the face of the magnetic body. The armature is released by springs when the magnetic winding is deenergized.

None of the above-identified patents disclose a continuous frame member with a fulcrum which is located on the opposite side of the lever from the side of the lever facing the brake disk, nor is a frame member disclosed which supports the electromagnetic means, for direct connection with the brake lever without linkage or cam assemblies, and also supports the spring means, between the frame member and the brake lever, positioned further than the electromagnetic means from the fulcrum, allowing use of a long, low spring-rate design and eliminating the need for spring adjustment. Furthermore, it would be advantageous to locate the electromagnetic means and the pressure point on the brake pad between the fulcrum and the spring means, so that the force on the fulcrum is always in the same direction, thereby eliminating the need for a hinged connection on the brake lever which is used in some of the disclosed art.

SUMMARY OF THE INVENTION

The present invention relates to a brake for a rotatable shaft with an end of the shaft extending outside of a housing. The end of the shaft is adapted to carry a disk generally perpendicular to the shaft, and the housing has a mounting surface facing the disk. The brake includes two support members secured to the mounting surface which extend from the mounting surface past the disk generally parallel to the shaft. An inner pressure pad is positioned on the support members adjacent to the mounting surface and in between the mounting surface and the disk. The inner pressure pad is positioned generally parallel to the disk. An outer pressure pad is positioned on the support members with the disk interposed in between the inner and outer pressure pads, and with the outer pressure pad positioned generally parallel to the disk. A first biasing means urges the outer pressure pad away from the disk. A lever is pivotally mounted on the support members at a distance away from the outer pressure pad and normally extends generally parallel to the outer pressure pad. Adjusting means for setting the distance between the outer pressure pad and the lever are provided. The adjusting means are secured to the lever and normally contact the outer pressure pad. A frame member is secured to the support members and to the mounting surface at a position opposite the support members relative to the shaft, and partially encloses the lever and the disk. The frame member has a fulcrum formed therein, protruding from the frame member, to contact the lever on a side opposite from the disk. Pivoting means, to move the lever about the fulcrum, are secured to the frame member and pivotally attached directly to the lever at a distance Y from the fulcrum. Second biasing means are connected to the frame member at one end and at another end to the lever, and positioned at a distance Z from the fulcrum which is at least equal to the distance Y from the fulcrum to the pivoting means.

The brake is preferably a spring applied, electromagnetically released brake to stop the rotation of the shaft.

The brake is arranged to provide direct acting electromechanical pivoting means to release the brake without linkage or cam assemblies, and long, low spring-rate biasing means to apply the brake without the need for spring adjustments. Positioning the pivoting means and the brake actuating force in between the biasing means and the fulcrum orientates the forces on the fulcrum in the same direction. This eliminates the need for a pin connection or its equivalent on the brake lever and eliminates the need for biasing means adjustment. It also reduces clearance problems and the pivoting means stroke distance. Furthermore, it simplifies the structure and reduces cost.

DESCRIPTION OF THE PREFERRED EMBODIMENTS

Figure 1:
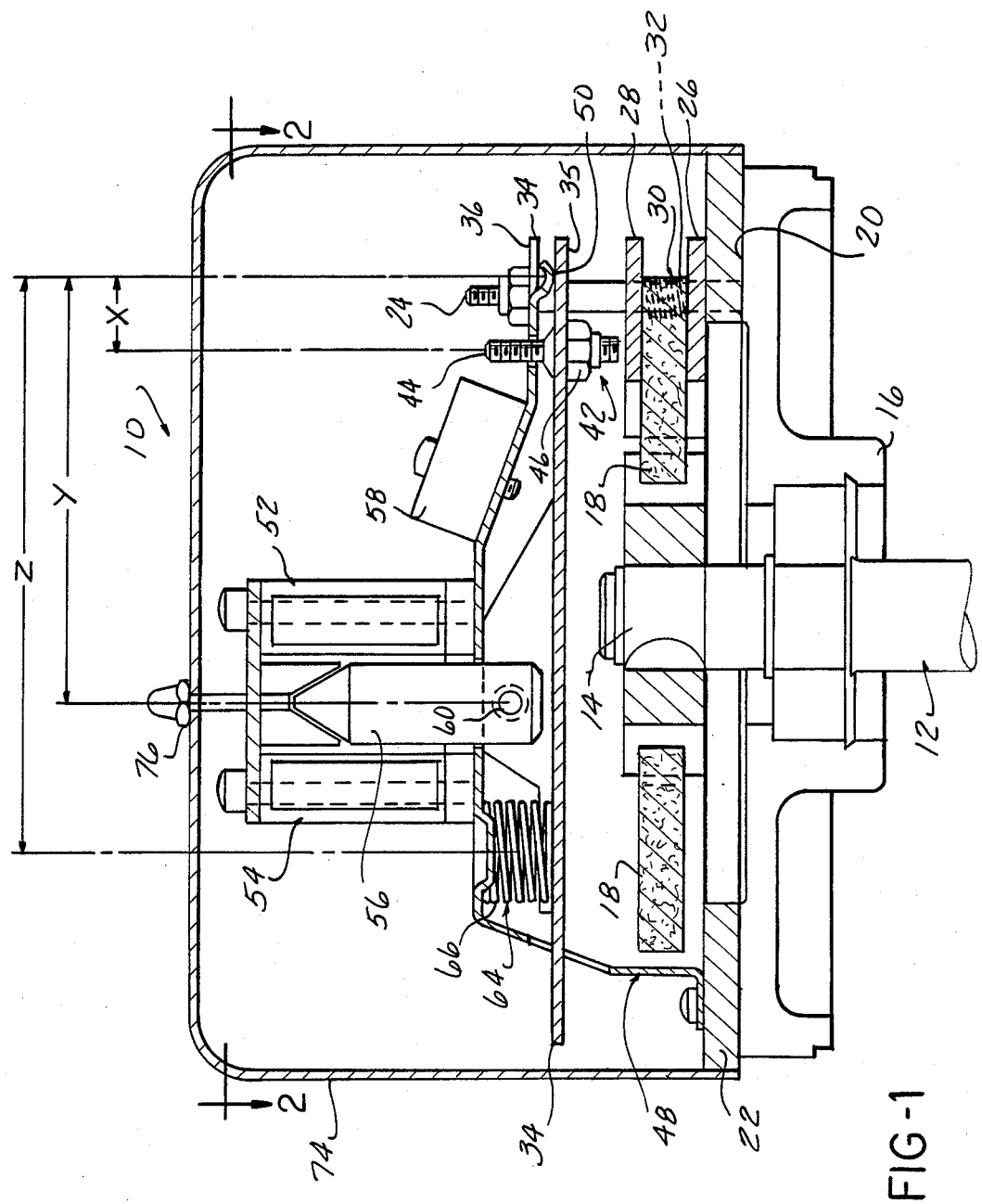
FIG. 1 is a sectional view of the brake, taken along lines 1—1 of FIG. 2, shown connected to a housing with a shaft extending outside of the housing.

Referring now to FIG. 1, a brake 10 for a rotatable shaft 12 is shown. An end 14 of shaft 12 extends outside of a housing 16. The end 14 of shaft 12 is adapted to carry a disk 18 generally perpendicular to the shaft 12. The housing 16 has a mounting surface 20 facing the disk 18. The brake 10 includes two support members 24 secured to the mounting surface 20. The support members 24 extend from the mounting surface 20 past the disk 18 generally parallel to the shaft 12. An inner pressure pad 26 is positioned on the support members 24 adjacent to the mounting surface 20 and in between the mounting surface 20 and the disk 18. The inner pressure pad 26 is held generally parallel to the disk 18. An outer pressure pad 28 is positioned on the support members 24, with the disk 18 interposed in between the inner pressure pad 26 and the outer pressure pad 28. The outer pressure pad 28 is held generally parallel to the disk 18. First means 30 for biasing the outer pressure pad 28 away from the disk 18 are provided. A lever 34 is pivotally mounted on the support members 24 at a distance away from the outer pressure pad 28 and normally extends generally parallel to the outer pressure pad 28. The lever 34 has a side 35 facing the disk 18 and another side 36 opposite from the disk 18. Means 42 for adjusting the distance between the outer pressure pad 28 and the lever 34 are provided. The means 42 for adjusting are secured to the lever 34 and normally contact the outer pressure pad 28 to transmit the brake actuating force from the lever 34. A continuous frame member 48 is secured to the support members 24 and to the mounting surface 20, at a position opposite the support members 24 relative to the shaft 12. The frame member 48 partially encloses the lever 34 and the disk 18. The frame member 48 has a fulcrum 50 formed thereon. The fulcrum 50 protrudes from the frame member 48 to contact the lever 34 on the side 36 opposite from the disk 18. Means 52 for pivoting the lever about the fulcrum are provided, and are secured to the frame member 48 and pivotally attached directly to the lever 34 at a distance Y from the fulcrum 50. Second means 64 for biasing the lever 34 are connected to the frame member 48 at one end and at another end to the lever 34, and positioned at a distance Z from the fulcrum 50, which is at least equal to the distance Y from the fulcrum 50 to the means 52 for pivoting.

In a first embodiment, the means 52 for pivoting the lever 34 about the fulcrum 50 comprises a solenoid 54 secured to the frame member 48, with an armature 56 pivotally secured to the lever 34 by a pin 60. The armature 56 moves toward the disk 18 when energized to apply the brake 10 by transmitting force from the lever 34 through the means 42 for adjusting to the outer pressure pad 28 to clamp the disk 18 in between the inner pressure pad 26 and the outer pressure pad 28 against the urging of the first means 30 for biasing. In addition, the second means 64 for biasing the lever 34 comprises a spring 66 connected to the frame member 48 at one end and at another end to the lever 34. The spring 66 urges the lever 34 to retract the armature 56 of the solenoid 54, when the solenoid 54 is deenergized. A rectifier 58 can also be secured to the frame member 48 for connection to the solenoid 54.

A second embodiment comprises the means 52 for pivoting the lever 34 about the fulcrum 50 to release the brake 10. The means 52 for pivoting are secured to the frame member 48 and pivotally attached to the lever 34 at a distance Y from the fulcrum 50. The means 52 for pivoting comprises a solenoid 54 secured to the frame member 48, with an armature 56 pivotally secured to the lever 34 by a pin 60, wherein the armature 56 moves away from the disk 18 when energized. A rectifier 58 can also be secured to the frame member 48 for connection to the solenoid 54. The second means 64 for biasing urges the lever 34 to apply the brake 10. The second means 64 for biasing can comprise a spring 66 which urges the lever 34 to pivot about the fulcrum 50 to transmit force from the lever 34 through the means 42 for adjusting to the outer pressure pad 28 to clamp the disk 18 in between the inner pressure pad 26 and outer pressure pad 28 against the urgings of the first means 30 for biasing. The second means 64 for biasing are positioned at a distance Z from the fulcrum 50 which is at least equal to the distance Y from the fulcrum 50 to the means 52 for pivoting.

Figure 2:
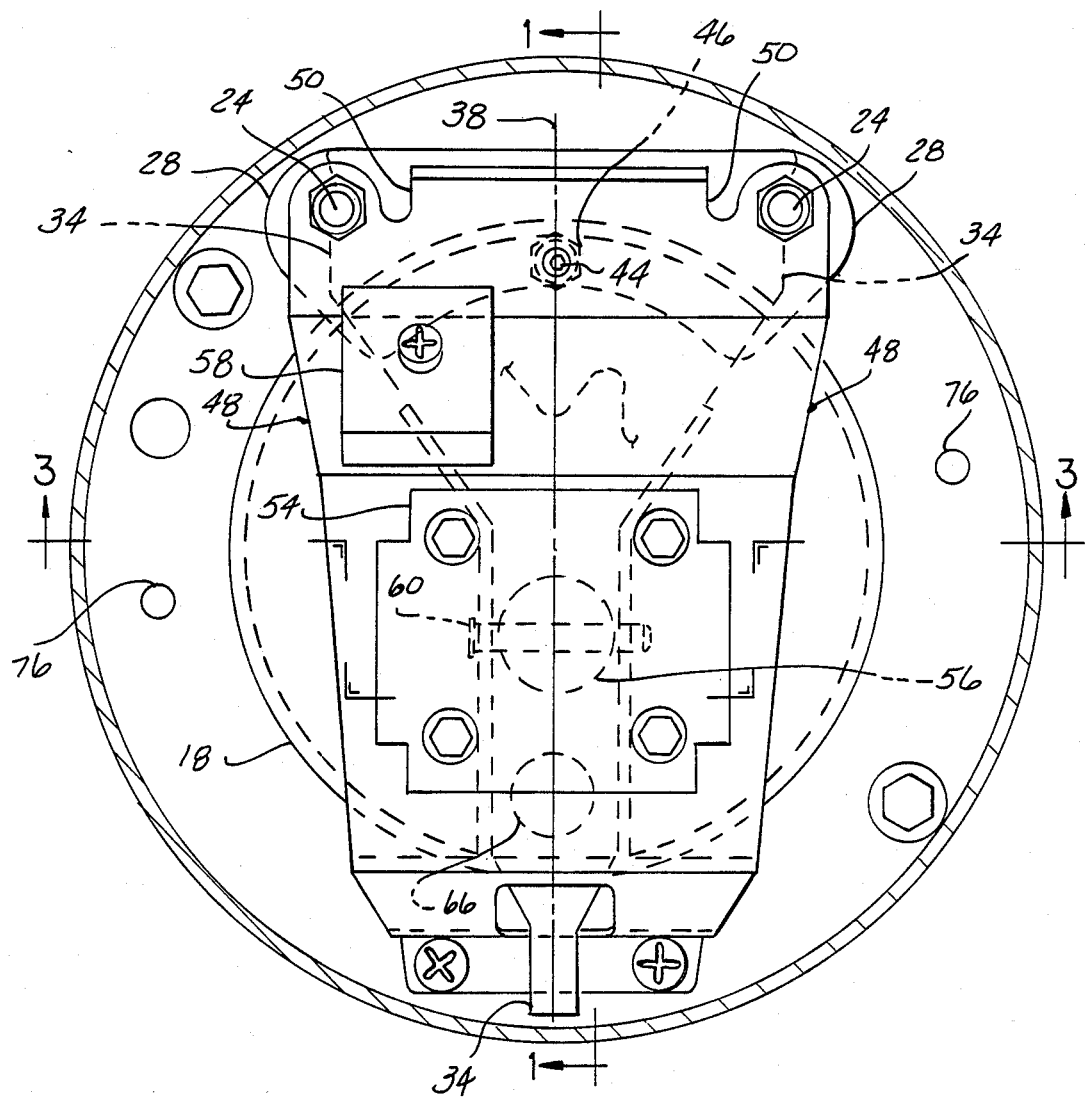
FIG. 2 is a sectional view of the brake, taken along lines 2—2 shown in FIG. 1.

In a third embodiment, the lever 34 has a longitudinal axis 38 equidistant from each of the support members 24, and the means 52 for pivoting, the means 42 for adjusting, and the second means 64 for biasing are centered on the longitudinal axis 38 (see FIG. 2).

A fourth embodiment positions the second means 64 for biasing at a distance Z from the fulcrum 50 which is greater than the distance Y from the fulcrum 50 to the means 52 for pivoting.

A fifth embodiment positions the means 42 for adjusting at a distance X from the fulcrum 50 which is at most equal to the distance Y from the fulcrum 50 to the means 52 for pivoting.

A sixth embodiment positions the second means 64 for biasing at a distance Z from the fulcrum 50 with the means 52 for pivoting secured to the lever 34 at a distance Y from the fulcrum 50 which is less than the distance Z, and the means 42 for adjusting secured to the lever 34 at a distance X from the fulcrum 50 which is less than the distance Y.

A seventh embodiment includes the longitudinal axis 38 of the lever 34 which is equidistant from each of the support members 24. The second means 64 for biasing is centered on the longitudinal axis 38 and secured to the lever 34 at a distance Z from the fulcrum 50. The means 52 for pivoting is centered on the longitudinal axis 38 and pivotally secured to the lever 34 at a distance Y from the fulcrum 50 which is less than the distance Z. The means 42 for adjusting is centered on a longitudinal axis 38 and secured to the lever 34 at a distance X from the fulcrum 50 which is less than the distance Y.

An eighth embodiment includes a portion of the lever 34 extending through the frame member 48 opposite from the support members 24, which will give a visual indication of the wear on the inner pressure pad 26 and outer pressure pad 28, as well as providing means for manually releasing the brake 10.

A ninth embodiment incorporates a cover 74 enclosing the brake 10, a base 22 securely affixed to the mounting surface 20 and adapted to receive the cover 74 enclosing the brake 10, and a fastener 76 securely attached to the base 22 and removably securing the cover 74 enclosing the brake 10.

The means 42 for adjusting the distance between the lever 34 and the outer pressure pad 28 can comprise an elongated threaded member 44 extending through the frame member 48 generally parallel to the support members 24, and a self-locking clinch nut 46 secured to the lever 34 and threadingly mateable with the elongated threaded member 44.

The means 52 for pivoting generally includes a solenoid 54 secured to the frame member 48, with an armature 56 pivotally secured to the lever 34 by a pin 60, and a rectifier 58 can also be secured to the frame member 48 for connection to the solenoid 54.

The second means 64 for biasing can comprise a spring 66 connected to the lever 34 at one end and at another end to the frame member 48 to urge the lever 34 to normally move in a direction opposed to the means 52 for pivoting, when the means 52 for pivoting are disengaged.

Figure 3:
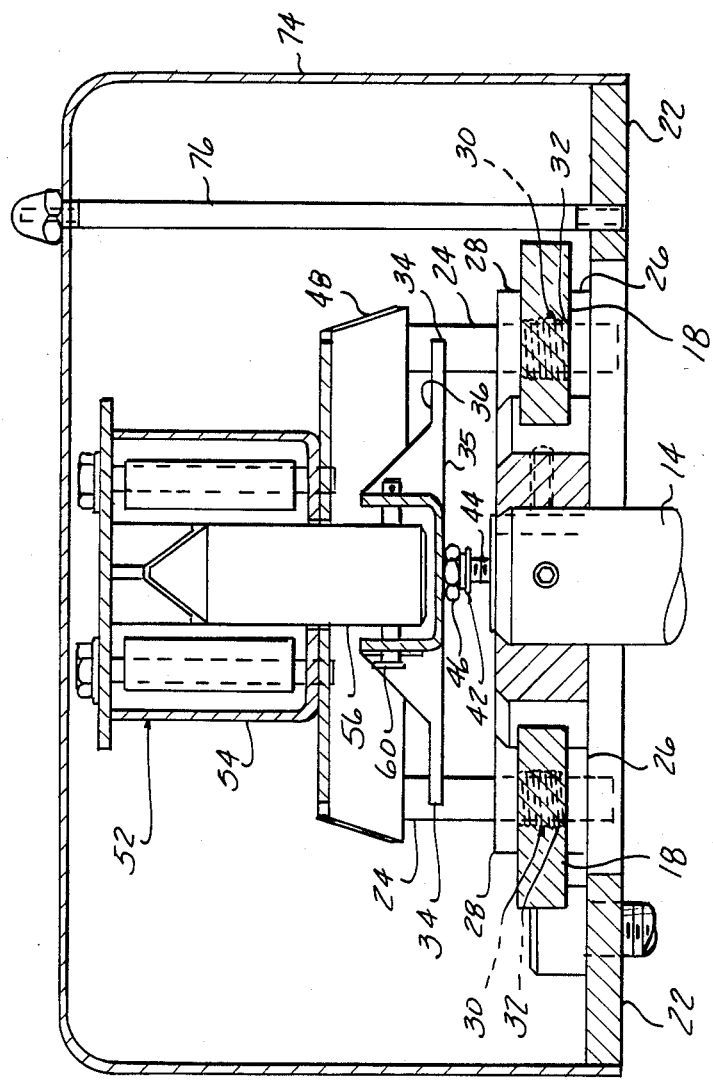
FIG. 3 is a sectional view of the brake, taken along lines 3—3 shown in FIG. 2.

The first means 30 for biasing can comprise a spring 32 inserted on each of the support members 24, and positioned in between the inner pressure pad 26 and the outer pressure pad 28 to provide a quick release from pressure on the disk 18 to reduce frictional drag, when the brake 10 is released (see FIG. 3).

The preferred embodiment of the present invention discloses a brake 10 for a rotatable shaft 12 with an end 14 of the shaft 12 extending outside of a housing 16. The end 14 of the shaft 12 is adapted to carry a disk 18 generally perpendicular to the shaft 12. The housing 16 has a mounting surface 20 facing the disk 18. The brake includes a base 22 securely affixed to the mounting surface 20 of the housing 16. Two support members 24 are secured to the base 22 and extend from the base 22 past the disk 18 generally parallel to the shaft 12. An inner pressure pad 26 is positioned on the support members 24 adjacent to the base 22 and in between the base 22 and the disk 18. The inner pressure pad 26 is generally parallel to the disk 18. An outer pressure pad 28 is positioned on the support members 24 with the disk 18 interposed in between the inner pressure pad 26 and the outer pressure pad 28. The outer pressure pad 28 is generally parallel to the disk 18. A spring 32 is inserted on each support member 24 and is positioned in between the inner pressure pad 26 and the outer pressure pad 28 to provide a quick release from pressure on the disk 18 to reduce frictional drag when the brake 10 is released. A lever 34 is pivotally mounted on the support members 24 at a distance away from the outer pressure pad 28, and normally extends generally parallel to the outer pressure pad 28. The lever 34 has a longitudinal axis 38 equidistant from the support members 24. The lever 34 also has a side 35 facing the disk 18 and another side 36 opposite from the side 35 facing the disk 18. A generally continuous frame member 48 is secured to the support members 24 and to the base 22 at a position opposite the support members 24 relative to the shaft 12. The frame member 48 partially encloses the lever 34 and the disk 18. The frame member 48 has a fulcrum 50 formed thereon which protrudes from the frame member 48 to contact the lever 34 on the side 36 opposite from the disk 18. An elongated threaded member 44, for adjusting the distance between the outer pressure pad 28 and the lever 34, normally contacts the outer pressure pad 28 at one end and another end extends through the frame member 48 generally parallel to the support members 24. A self-locking clinch nut 46 is secured to the lever 34 centered on the longitudinal axis 38 of the lever 34 at a distance X from the fulcrum 50, and is threadingly mateable with the elongated threaded member 44. A solenoid 54, for pivoting the lever 34 about the fulcrum 50, is secured to the frame member 48. The solenoid 54 has an armature 56 pivotally secured to the lever 34 by a pin 60 and is centered on the longitudinal axis 38 of the lever 34 at a distance Y from the fulcrum 50, which is greater than the distance X. A rectifier 58 can be secured to the frame member 48 for connection with the solenoid 54. A second spring 66, for biasing the lever in a direction normally against the movement of the armature 56 of the solenoid 54, is centered on the longitudinal axis 38 of the lever 34 and positioned a distance Z from the fulcrum 50, which is greater than the distance Y.

Although the best mode contemplated for carrying out the present invention has been herein shown and described, it will be apparent that modification and variation may be made without departing from what is regarded to be the subject matter of the invention herein.

I claim:
1. A brake for a rotatable shaft with an end of said shaft extending outside of a housing, said end of said shaft adapted to carry a disk generally perpendicular to said shaft, and said housing having a mounting surface facing said disk, the brake comprising:

two support members secured to said mounting surface and extending from said mounting surface past said disk generally parallel to said shaft;

an inner pressure pad positioned on the support members adjacent to said mounting surface in between said mounting surface and said disk, and with the inner pressure pad generally parallel to said disk;

an outer pressure pad positioned on the support members with said disk interposed in between the inner pressure pad and the outer pressure pad, and with the outer pressure pad generally parallel to said disk;

first means for biasing the outer pressure pad away from said disk;

a lever, having a side facing said disk and another side opposite from said disk, pivotally mounted on the support members at a distance away from the outer pressure pad and normally extending generally parallel to the outer pressure pad;

means for adjusting the distance between the outer pressure pad and the lever, said means for adjusting secured to the lever and normally contacting the outer pressure pad;

a frame member secured to the support members and to said mounting surface, at a position opposite the support members relative to said shaft, partially enclosing the lever and said disk;

the frame member having an unrestrained fulcrum integrally formed thereon protruding from the frame member for unrestrained pivotal contact with the lever on the side opposite from said disk;

electro-mechanical means for pivoting the lever about the fulcrum secured to the frame member and pivotally attached directly to the lever at a distance Y from the fulcrum; and spring means for biasing the lever against the electro-mechanical means for pivoting, connected to the frame member at one end and at another end to the lever, and positioned at a distance Z from the fulcrum at least equal to the distance Y.

2. The brake as recited in claim 1, wherein the electro-mechanical means for pivoting applies the brake by pivoting the lever about the fulcrum to transmit force from the lever through the means for adjusting to the outer pressure pad to clamp said disk in between the inner pressure pad and the outer pressure pad against the urging of the first means for biasing; and the spring means for biasing releases the brake by urging the lever normally against the electro-mechanical means for pivoting.

3. The brake as recited in claim 1, wherein the electro-mechanical means for pivoting releases the brake by pivoting the lever about the fulcrum to remove the force transmitted from the lever through the means for adjusting to the outer pressure pad; and the spring means for biasing applies the brake by normally pivoting the lever about the fulcrum to transmit force from the lever through the means for adjusting to the outer pressure pad to clamp said disk in between the inner pressure pad and the outer pressure pad against the urging of the first means for biasing.

4. The brake as recited in claim 1, further comprising:
the lever having a longitudinal axis equidistant from each of the support members; and
wherein the electro-mechanical means for pivoting, the means for adjusting, and the spring means for biasing are centered on the longitudinal axis.

5. The brake as recited in claim 1, wherein the spring means for biasing is positioned at a distance Z from the fulcrum which is greater than the distance Y.

6. The brake as recited in claim 1, further comprising the means for adjusting positioned at a distance X from the fulcrum which is at most equal to the distance Y.

7. The brake as recited in claim 1, further comprising:
the spring means for biasing secured to the lever at a distance Z from the fulcrum;
the electro-mechanical means for pivoting secured to the lever at a distance Y from the fulcrum which is less than the distance Z; and the means for adjusting secured to the lever at a distance X from the fulcrum which is less than the distance Y.

8. The brake as recited in claim 1, further comprising:
the lever having a longitudinal axis equidistant from each of the support members;
the spring means for biasing centered on the longitudinal axis and secured to the lever at a distance Z from the fulcrum;
the electro-mechanical means for pivoting centered on the longitudinal axis and pivotally secured to the lever at a distance Y from the fulcrum which is less than the distance Z; and
the means for adjusting centered on the longitudinal axis and secured to the lever at a distance X from the fulcrum which is less than the distance Y.

9. The brake as recited in claim 1, further comprising the lever having a portion extending through the frame member opposite from the support members, relative to said shaft, for indicating wear on the inner pressure pad and the outer pressure pad, and for manually releasing the brake.

10. The brake as recited in claim 1, further comprising:
a cover enclosing the brake;
a base securely affixed to said mounting surface and adapted to receive the cover enclosing the brake; and
a fastener securely attached to the base and removably affixing the cover enclosing the brake.

11. The brake as recited in claim 1, wherein the means for adjusting comprises:
an elongated threaded member extending through the frame member at one end and at another end normally contacting the outer pressure pad; and
a self-locking clinch nut secured to the lever and threadingly mateable with the elongated threaded member.

12. The brake as recited in claim 1, wherein the electro-mechanical means for pivoting comprises:
a solenoid secured to the frame member, with an armature pivotally secured to the lever; and
a rectifier secured to the frame member for connection with the solenoid.

13. The brake as recited in claim 1, wherein the spring means for biasing comprises:
a spring connected to the lever at one end and at another end to the frame member to move the lever in a direction opposing the electro-mechanical means for pivoting when said electro-mechancial means for pivoting is disengaged.

14. The brake as recited in claim 1, wherein the first means for biasing comprises:
a plurality of springs, wherein one of the plurality of springs is inserted on each of the support members and positioned in between the inner pressure pad and the outer pressure pad to provide a quick release from pressure on said disk to reduce frictional drag when the brake is released.

* * * * *